No. 651,960. Patented June 19, 1900.
C. A. WIDMER.
WORKMAN'S TIME RECORDER.
(Application filed June 14, 1897.)
(No Model.) 4 Sheets—Sheet 1.
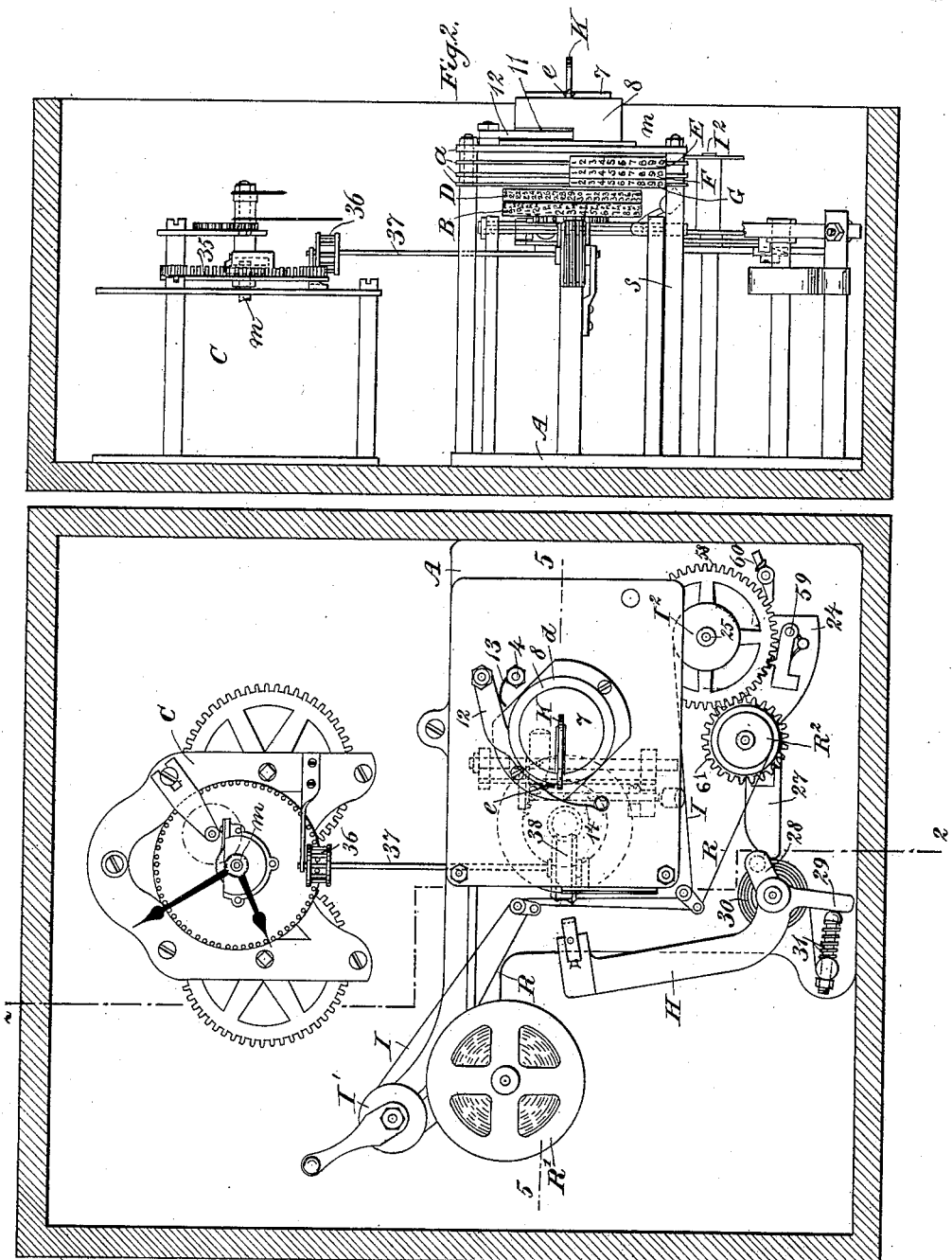
WITNESSES: INVENTOR:
Charles A. Widmer,
BY
ATTORNEY No. 651,960. Patented June 19, 1900.
C. A. WIDMER.
WORKMAN'S TIME RECORDER.
(Application filed June 14, 1897.)
(No Model.) 4 Sheets—Sheet 2.
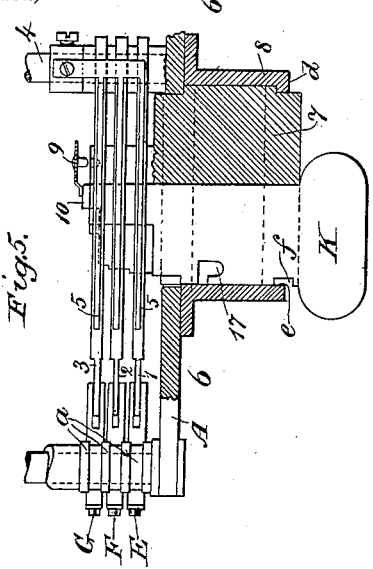
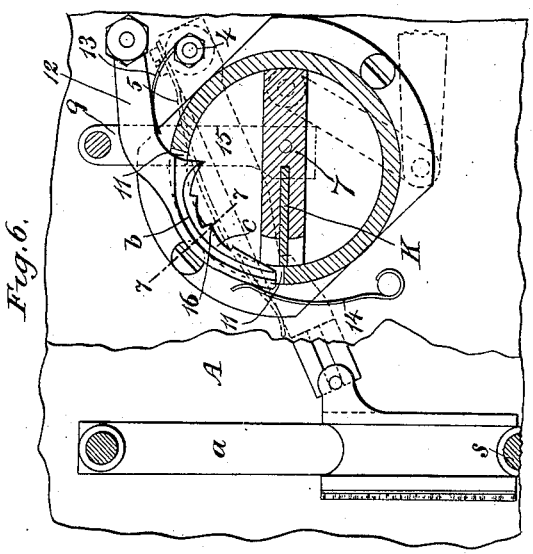
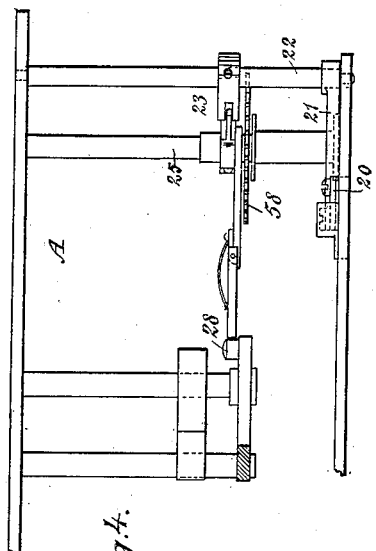
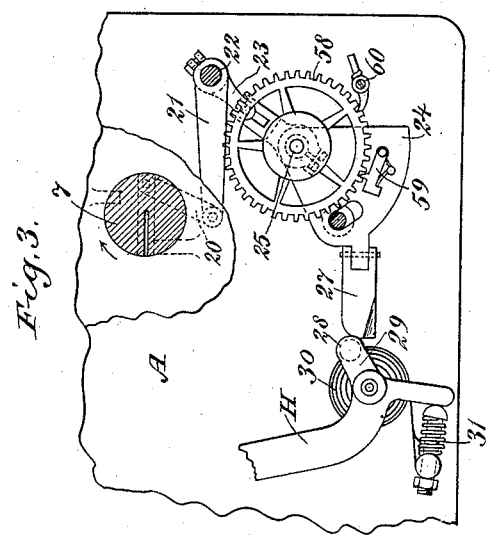
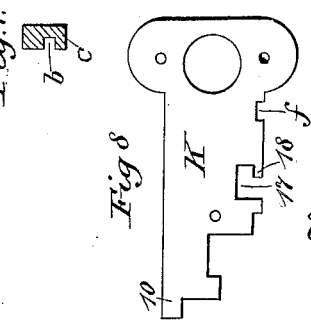
WITNESSES:
Gw A Eisenbraun
L. N. Legendre
INVENTOR
Charles A. Widmer
BY
[signature]
ATTORNEY
THE NORRIS PETERS CO., PHOTO-LITHO., WASHINGTON, D. C.

No. 651,960. Patented June 19, 1900.
C. A. WIDMER.
WORKMAN'S TIME RECORDER.
(Application filed June 14, 1897.)
(No Model.) 4 Sheets—Sheet 3.
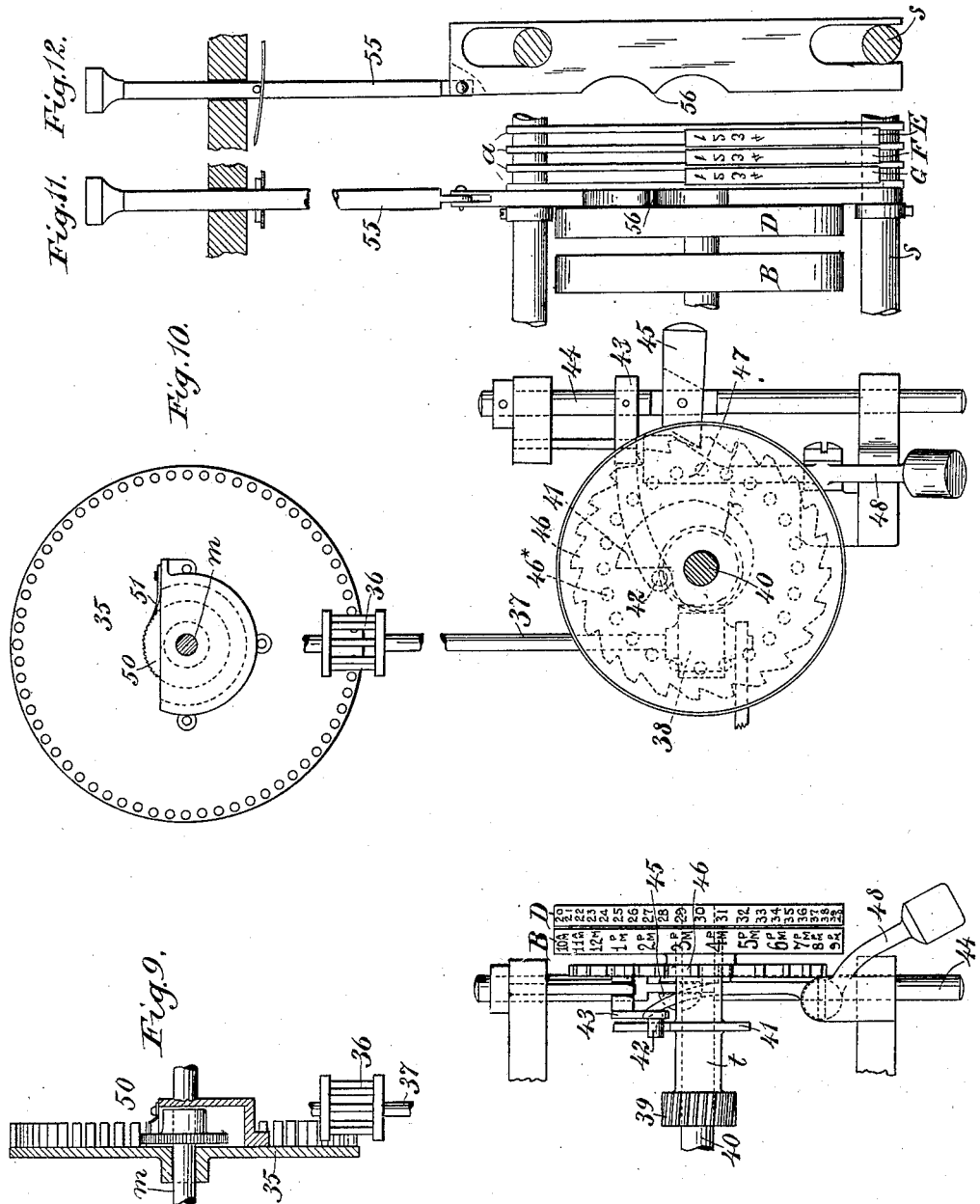
WITNESSES:
INVENTOR,
Charles A. Widmer
BY
ATTORNEY No. 651,960. Patented June 19, 1900.
C. A. WIDMER.
WORKMAN'S TIME RECORDER.
(Application filed June 14, 1897.)
(No Model.) 4 Sheets—Sheet 4.

WITNESSES:
Geo. W. Eisenbrauer
M. Erwin

INVENTOR:
Charles A. Widmer
BY
A Faber du Faur
ATTORNEY.

UNITED STATES PATENT OFFICE.

CHARLES A. WIDMER, OF NEW YORK, N. Y., ASSIGNOR TO JOSEPH S. COOKE, OF NEWARK, NEW JERSEY.

WORKMAN'S TIME-RECORDER.

SPECIFICATION forming part of Letters Patent No. 651,960, dated June 19, 1900.

Application filed June 14, 1897. Serial No. 640,607. (No model.)

*To all whom it may concern:*

Be it known that I, CHARLES A. WIDMER, a citizen of the United States of America, and a resident of New York, in the county and State of New York, have invented a certain new and useful Improvement in Workmen's Time-Recorders, of which the following is a specification.

My invention has reference to improvements in workmen's time-recorders, and especially to improvements in the devices for actuating the numeral-printing mechanism by the key and to the transmission from the timepiece to the time-wheels.

It has for its objects, first, to prevent the key from being withdrawn until it has operated the machine to produce a record; secondly, to insure accurate time being kept by the clock; thirdly, to prevent the recorder from being operated excepting by the use of a proper key, and, lastly, to provide means for indicating whether the record was made when the employee entered or left the place of business.

The nature of my invention will best be understood when described in connection with the accompanying drawings, in which—

Figure 15:
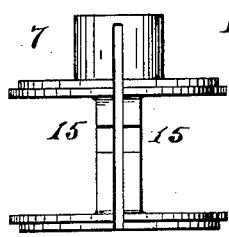
Figure 16:
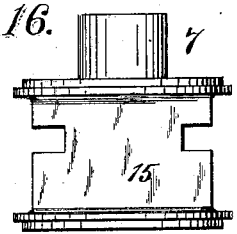
Figure 13:
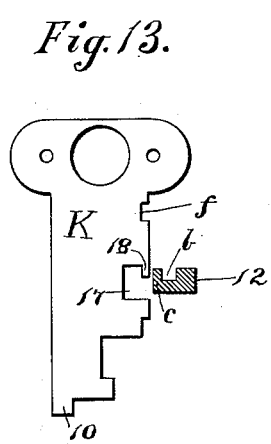
Figure 14:
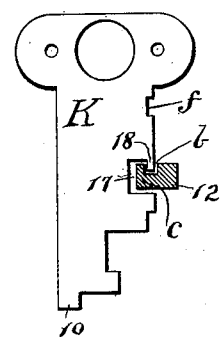
Figure 17:
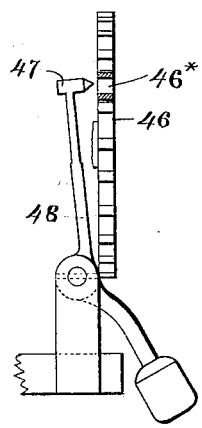

Figure 1 represents a face view of the recorder mechanism with the inclosing case in cross-section. Fig. 2 is a vertical section on the line 2 2, Fig. 1. Fig. 3 is a face view with the barrel in section and illustrating the mechanism for operating the platen. Fig. 4 is a top view of Fig. 3 with the barrel removed. Fig. 5 is an enlarged section taken on the line 5 5, Fig. 1. Fig. 6 is a section taken on the line 6 6, Fig. 5. Fig. 7 is a section through the locking-lever on the line 7 7, Fig. 6. Fig. 8 is a face view of a key. Fig. 9 is a sectional elevation, on an enlarged scale, illustrating the transmission between the timepiece and the time-wheels. Fig. 10 is a face view of the same. Fig. 11 is a vertical section illustrating means for forming an auxiliary record. Fig. 12 is a face view of the same. Fig. 13 is a sectional plan showing the key in engagement with the notches of the locking-lever. Fig. 14 is a similar view showing the key on its return stroke. Fig. 15 is a side view of the barrel, taken from the left of Fig. 6. Fig. 16 is a plan view of the same. Fig. 17 is a detail view of a portion of the mechanism.

Similar letters and numerals of reference designate corresponding parts throughout the several views of the drawings.

Referring to the drawings, the letter A designates a frame or base-plate suitably constructed to support the several parts.

C is the clock-movement, from which the time-wheels B D are driven.

R is the paper ribbon or tape, coiled on a suitable delivery-spool R' at the top of the frame A and conducted to the take-up roll $R^2$ at the bottom of the frame.

I is the ink-ribbon, supplied from the spool I' and received by the take-up roll $I^2$, and H is the platen, arranged opposite to the time-wheels and the type-plates.

I will now proceed to describe the mechanism for sliding the several type-plates to bring the type thereon into a position corresponding to the number of the key.

The type-plates E F G are fitted to reciprocate vertically between rectilinear guides $a$, secured to the frame A. Said type-plates are provided on their upper or printing faces with numerals or other suitable characters. In the present instance I make use of numerals, of which those on the plate E correspond to the units, those on the plate F to the tens, and those on the plate G to the hundreds. The type-plates are engaged by separate actuating-levers 1, 2, and 3, adapted to turn about a common stud 4 and subjected to the action of springs 5, which cause the type-plates to be held in their lowest position against a suitable stop, which may be formed by one of the studs $s$ of the frame. These levers are arranged in the path of the key and are adapted to be actuated by the same to bring the type-plates into the positions corresponding to the number to be printed. To the front of the frame A is attached a barrel 7 by means of a suitable casing 8, which barrel is arranged to turn through a quadrant and is provided with the usual slot or key-hole. Normally the barrel is held from turning by a spring-detent 9, which engages with a notch or socket in said barrel and is placed in line with a projection 10 on the key, so that when the key is completely inserted it pushes the detent inwardly and disengages the same from the barrel, thereby permitting the barrel to be turned by the key. This practically prevents the recorder from being operated by means other than the proper key.

To prevent the key from being withdrawn before it is turned through a quadrant, so as to insure a complete record in each instance, I provide the following means: The casing is provided with a peripheral slot 11, and through said slot passes a portion of a locking-lever 12, which is acted upon on one side by a spring 13 and on the opposite side by a spring 14, so that it can be vibrated in either direction, but will always be returned to its normal position, as shown in Fig. 6. The portion of the locking-lever 12 passing through the casing enters the barrel, which latter is slotted on both sides, as shown in Figs. 6, 15, and 16 and indicated by numeral 15, to permit the locking-lever to extend over the barrel. Said portion has therein a curved groove $b$, which forms a flange $c$, and said flange is provided on its inner face with ratchet-teeth, forming a series of stops 16, which are in the path of the key. The casing 8 is provided with a peripheral flange $d$, which is notched out, as at $e$, opposite the slot in the barrel 7 to permit the insertion of the key. The key is notched, as at $f$, into which notch the flange $d$ enters when the key is turned to actuate the recorder, and said flange consequently prevents the removal of the key.

Each key is provided with an L-shaped notch 17, leaving a nose 18. When the key is inserted into the barrel and turned to the right a short distance, the outer side of the nose 18 engages the ratchet-teeth 16 of the lever 12, and as the nose successively passes the said teeth the lever 12 falls inwardly and the teeth close behind the key, thus forming stops preventing any attempt to turn the key backward far enough to effect its removal. After the key has been turned a quadrant and has passed the flange $c$ the lever 12 is in the position shown in Fig. 6. The end of the flange $c$ is turned inwardly, so that when the key leaves the flange on being turned through a complete quadrant the nose 18 thereon can readily enter the groove $b$ in the locking-lever in view of the latter falling slightly inward when the key leaves the flange. The key can now be turned in the opposite direction, as the nose 18 now travels in the groove $b$, and its removal effected when it is brought opposite the notch $e$ in the casing 8. The nose of the key is shown in contact with the ratchet-teeth of the lever 12 in Fig. 13, and in Fig. 14 the nose of the key is shown in the groove $b$ of said lever. It will be readily understood that one ratchet-tooth or stop 16 near the outer end of the lever 12 would suffice to prevent removal of the key until it had been turned sufficiently to actuate the recorder; but I prefer to use a series of said stops, as it prevents the machine from being racked by working the key back and forth.

The operation of turning the key forward through a quadrant also actuates the platen, while the return movement feeds the paper strip or ribbon R and the ink-ribbon I forward. In the present example, Figs. 1, 3, and 4, the barrel 7 is connected by a link 20 with one arm 21 of a rock-frame 22, the other arm 23 of which engages with a segment 24, rigidly mounted on a shaft 25 and provided with a trip-pawl 27, which engages with a stud 28 on the arm 29 of the platen. The platen, as usual, is subjected to the action of a spring 30 and adapted to contact with a buffer 31. When the key is turned to actuate the printing mechanism, the segment is turned first to lift and then to release the platen after the proper types on the type-plates have been brought into the printing-line. When the key is turned backward to effect its removal, the actuating parts of the platen are returned to their normal positions.

I shall now proceed to describe the transmission between the timepiece C and the time-wheels B D.

On the minutes-arbor $m$ of the timepiece is mounted a pinion 35, which engages with a pinion 36, mounted near the upper end of a spindle 37, having at its lower end a worm 38, engaging with a worm-gear 39, formed on the hub $t$ of the minutes type-wheel D, which latter is mounted on a shaft 40. On the said hub $t$ is mounted a cam 41, on which bears the stud 42 of an arm 43, which arm is attached to a sliding rod 44, carrying a pawl 45, which engages with the teeth of a ratchet feed-wheel 46, placed in connection with the hub of the hours type-wheel B. The ratchet feed-wheel is provided with a circular series of registering holes 46*, in the line of which is arranged a pin 47, carried by a weighted registering-lever 48. The relative arrangement of the ratchet-wheel and the registering-lever 48 is shown in Fig. 17. At each turn of the minutes-wheel the hours-wheel is turned through one tooth by the cam 41, and accurate registration is effected by lever 48 and holes 46*. A ratchet-wheel 50 is placed on the minutes-arbor of the timepiece, which is engaged by a pawl 51 to prevent retrograde movement of pinion 35.

It will be readily understood in view of the worm-and-gear transmission that the shock due to the striking of the platen will not affect the timepiece, said shock being taken by the worm, while heretofore the shock and consequent motion were transmitted through the gears and caused inaccuracy in time.

To indicate on the record whether the recorder was operated by the employee on entering or on leaving, I may provide auxiliary means for forming a record on the strip or ribbon. The same, as shown in Figs. 11 and 12, may consist of a spring-pressed push-bar 55, passing through the top of the casing and provided on its inner end with a character—such, for instance, as the dash 56—which is normally above the platen H, but when the bar is depressed is brought in line with the platen and forms an impression on the strip or ribbon when the platen is actuated. In practice I arrange this auxiliary printing device between the minutes-wheel D and the type-plates for the numerals; but it may be differently arranged. Two of these push-bars may be employed, the one to indicate entering and the other leaving; but one is practically sufficient if instructions are given to depress the button only on leaving or on entering.

To feed forward the paper strip or ribbon and the ink-strip at each operation of the machine, a gear-wheel 58 is placed on the take-up roll I² of the ink-ribbon, which gear-wheel and roll are loose on the shaft 25. The gear-wheel is engaged by a pawl 59 on the segment 24 to turn the same forward whenever the barrel 7 is turned. Retrograde motion of the gear-wheel is prevented by a stop-pawl 60. The take-up roll R² for the paper strip or ribbon is turned by a gear-wheel 61, meshing with the gear-wheel 58.

What I claim as new is—

1. In a time-recorder, the combination of a barrel mounted to turn and provided with a slot for the passage of the key, of a detent engaging with the inner end of said barrel for locking the same and placed in the path of a portion of the key for its disengagement from the barrel by the key, substantially as described.

2. In a time-recorder, a locking device, a barrel held from turning by said locking device, and a key provided with a projection adapted to engage with said locking device for releasing the barrel, substantially as described.

3. In a time-recorder, the combination of a barrel mounted to turn and provided with a slot for the passage of the key, a locking device engaging with said barrel to normally hold the same from turning and adapted to be engaged by the key for releasing the barrel, and means for preventing retrograde motion of the key until the mechanism has been actuated to form a complete record, substantially as described.

4. In a time-recorder, the combination of a casing provided with a retaining-flange for the key, a barrel mounted to turn and provided with a slot for the passage of the key, a locking-lever entering said barrel and provided with a stop to prevent retrograde motion of the key, and springs acting on said lever from opposite sides; said lever being constructed to permit return movement of the key after the full stroke of the key has been made, substantially as described.

5. In a time-recorder, the combination of a casing provided with a retaining-flange for the key, a barrel mounted to turn in said casing and provided with a slot for the passage of the key, a spring-pressed locking-lever provided with a series of teeth forming stops to prevent retrograde movement of the key and with a curved groove, and a key having a notch adapted to be engaged by the retaining-flange of the casing and a notch to permit return movement of the same after its full stroke has been made, substantially as described.

6. In a time-recorder, the combination of a type-plate mounted to slide, a barrel mounted to turn and provided with a slot for the passage of the key; and a lever placed in connection with the type-plate and arranged in the path of the key, substantially as described.

7. In a time-recorder, the combination of a barrel mounted to turn, a lever, a link connection between said lever and the barrel, a segment placed in connection with said lever and provided with a trip-pawl engaging with the platen, a gear-wheel and take-up roll mounted on the shaft of the segment, a take-up roll provided with a gear meshing with said gear-wheel, a feed-pawl on the segment, and a stop-pawl, substantially as described.

In testimony that I claim the foregoing as my invention I have signed my name, in presence of two witnesses, this 12th day of March, 1897.

CHARLES A. WIDMER.

Witnesses:
EUGENIE A. PERSIDES,
GEO. W. EISENBRAUN.